United States Patent
Paluncic et al.

(10) Patent No.: US 8,196,709 B2
(45) Date of Patent: Jun. 12, 2012

(54) LUBRICANT DISTRIBUTOR

(75) Inventors: Zdravko Paluncic, Ludwigshafen (DE);
Markus Mandera, Leimen (DE)

(73) Assignee: Lincoln GmbH, Walldorf (DE)

( * ) Notice: Subject to any disclaimer, the term of this patent is extended or adjusted under 35 U.S.C. 154(b) by 443 days.

(21) Appl. No.: 12/444,717

(22) PCT Filed: Aug. 24, 2007

(86) PCT No.: PCT/EP2007/007436
§ 371 (c)(1),
(2), (4) Date: Apr. 8, 2009

(87) PCT Pub. No.: WO2008/046466
PCT Pub. Date: Apr. 24, 2008

(65) Prior Publication Data
US 2010/0096218 A1    Apr. 22, 2010

(30) Foreign Application Priority Data
Oct. 20, 2006   (DE) .................... 20 2006 016 377 U

(51) Int. Cl.
*F16N 25/00* (2006.01)
*B05B 1/30* (2006.01)

(52) U.S. Cl. ........................................................ 184/7.4

(58) Field of Classification Search .................. 184/6.5, 184/6.6, 6.9, 7.4, 15.1–2, 26, 34, 105.3; 116/264, 116/266, 272, 273, 276; 222/156–159; 417/63
See application file for complete search history.

(56) References Cited

U.S. PATENT DOCUMENTS

| | | | | |
|---|---|---|---|---|
| 3,958,725 A | * | 5/1976 | Reeve | 222/335 |
| 4,079,866 A | * | 3/1978 | Asioli | 222/335 |
| 5,311,968 A | * | 5/1994 | Pingel | 184/6.4 |
| 5,697,345 A | * | 12/1997 | Genter et al. | 123/470 |
| 5,810,115 A | * | 9/1998 | Mismas | 184/7.4 |
| 7,726,448 B2 | * | 6/2010 | Paluncic et al. | 184/41 |
| 2007/0068739 A1 | * | 3/2007 | Croci | 184/105.3 |
| 2007/0175705 A1 | * | 8/2007 | Adolf et al. | 184/6.5 |
| 2008/0289906 A1 | * | 11/2008 | Przybylsky | 184/7.4 |
| 2010/0038178 A1 | * | 2/2010 | Paluncic et al. | 184/15.1 |
| 2010/0096218 A1 | * | 4/2010 | Paluncic et al. | 184/7.4 |

(Continued)

FOREIGN PATENT DOCUMENTS

CA    2627448 A1    5/2007

(Continued)

OTHER PUBLICATIONS

English translation of International Preliminary Report regarding International application No. PCT/EP2007/007436, mailed Aug. 4, 2009, 8 pages.

(Continued)

*Primary Examiner* — Michael Mansen
*Assistant Examiner* — Mark K Buse
(74) *Attorney, Agent, or Firm* — Senniger Powers LLP

(57) ABSTRACT

The invention relates to a lubricant distributor with a distributor plate (1, 21) and one or more injectors (2, 22) that can be connected to this plate and that are each formed from a housing (8, 28) defining a longitudinal axis with an inlet (11, 31) and an outlet (14, 34) that connect to corresponding connections in the distributor plate, and also from a dosing and reversing unit that is formed in the housing, wherein the inlets and outlets are arranged on the side of the housing facing the distributor plate (FIG. 1).

5 Claims, 3 Drawing Sheets

U.S. PATENT DOCUMENTS

2010/0178000 A1* 7/2010 Paluncic .................. 384/322

FOREIGN PATENT DOCUMENTS

| DE | 202005017065 U1 | 3/2006 |
| --- | --- | --- |
| EP | 0981008 B1 | 2/2000 |
| EP | 1712829 A2 | 10/2006 |
| JP | 2005201348 A | 7/2005 |
| JP | 2002130592 A | 5/2009 |

OTHER PUBLICATIONS

International Search Report dated Apr. 14, 2009 regarding PCT/EP2007/007436, 12 pages, and 2 page English Translation of Form PCT/ISA/210 (patent family annex).

International Preliminary Report on Patentability regarding PCT/EP2007/007436, 10 pages.

* cited by examiner

LUBRICANT DISTRIBUTOR

FIELD OF THE INVENTION

The invention relates to a lubricant distributor with a distributor plate and at least one injector that can be connected to this plate. The invention further relates to an injector and also a distributor plate for such a lubricant distributor.

BACKGROUND OF THE INVENTION

From EP 0 981 008 B1, a lubricant distributor is known in which the injectors (distributor elements) are formed directly in the distributor plate. Consequently, the injectors have no separate housing and this arrangement can make the rapid exchange of individual injectors more difficult. Furthermore, in a few applications, the exchangeability of the entire lubricant distributor is seen as in need of improvement.

Therefore, the task of the present invention is to create a lubricant distributor that makes use of a large number of individually exchangeable injectors possible by simple and quick assembly and disassembly.

SUMMARY OF THE INVENTION

In one aspect, this invention is directed to a lubricant distributor comprising a distributor plate and one or more injectors connected to the distributor plate. Each injector comprises a housing having a longitudinal axis, an inlet and an outlet. The inlet and outlet connect to corresponding connections in the distributor plate. The distributor also includes a dosing and reversing unit in the housing. The inlet and outlet of the housing are arranged on the housing to face the distributor plate.

In another aspect, this invention is directed to an injector for a lubricant distributor. The injector comprises a housing in which a lubricant inlet and a lubricant outlet are formed on a same end and/or on a same side of the housing, and a dosing and reversing unit in the housing. The dosing and reversing unit comprises a cylindrical chamber, a piston movable in the cylindrical chamber by lubricant pressure against the force of an elastic element, and a check valve located between the cylindrical chamber and the lubricant inlet. The piston divides the cylindrical chamber into a first chamber communicating with the lubricant inlet and a second chamber communicating with the lubricant outlet. A bypass channel is provided for connecting the first and second chambers for dosing and/or shifting the lubricant.

In another aspect, this invention is directed to a distributor plate for a lubricant distributor. The distributor plate comprises a lubricant supply channel that opens by means of inlet channels into a first connection that can be connected to a lubricant inlet of an injector, and several lubricant discharge channels that open by means of outlet channels into a second connection that can be connected to a lubricant outlet of an injector. The first and second connections are formed on or in a first side surface of the distributor plate, and the lubricant discharge channels are formed on or in another side surface of the distributor plate.

The invention will be described in more detail below using embodiments and with reference to the drawing. Here, all of the described and/or illustrated features by themselves or in arbitrary combination form the subject matter of the invention, independent of their summary in the claims or their references.

BRIEF DESCRIPTION OF THE DRAWINGS

Shown schematically are.

DETAILED DESCRIPTION

Figure 1:
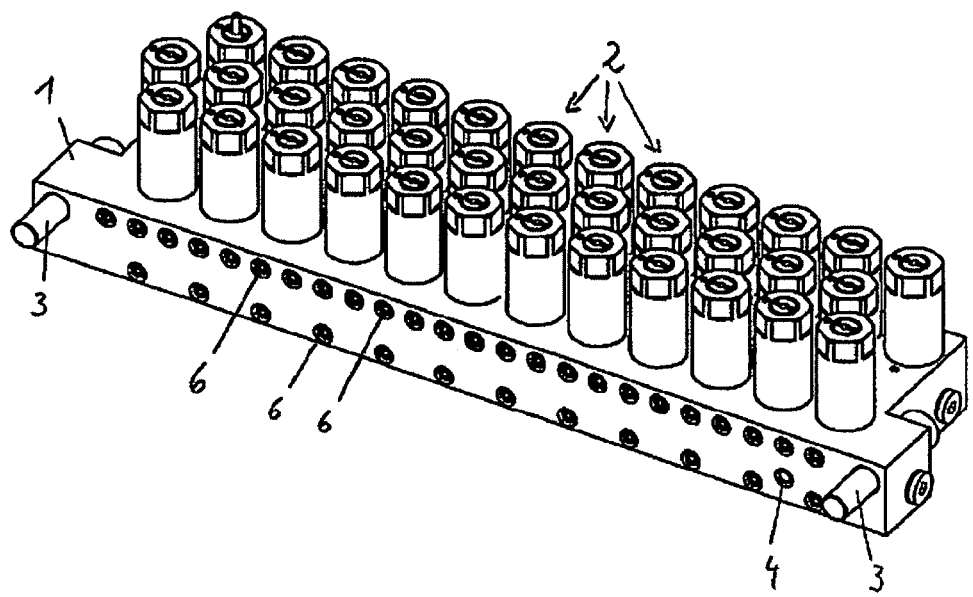
FIG. 1, in perspective view, a lubricant distributor according to a first embodiment of the invention, FIG. 2, in side view, the lubricant distributor according to FIG. 1, FIG. 3, a top view of the lubricant distributor according to FIG. 1, FIG. 4, a section through the lubricant distributor according to FIG. 1, FIG. 5, in perspective view, an injector of the lubricant distributor according to FIG. 1, FIG. 6, a section through the injector according to FIG. 5, FIG. 7, in perspective view, a lubricant distributor according to a second embodiment of the invention, FIG. 8, a top view of the lubricant distributor according to FIG. 7, FIG. 9, in perspective view, an injector of the lubricant distributor according to FIG. 7, and FIG. 10, a section through the injector according to FIG. 9.
Figure 2:
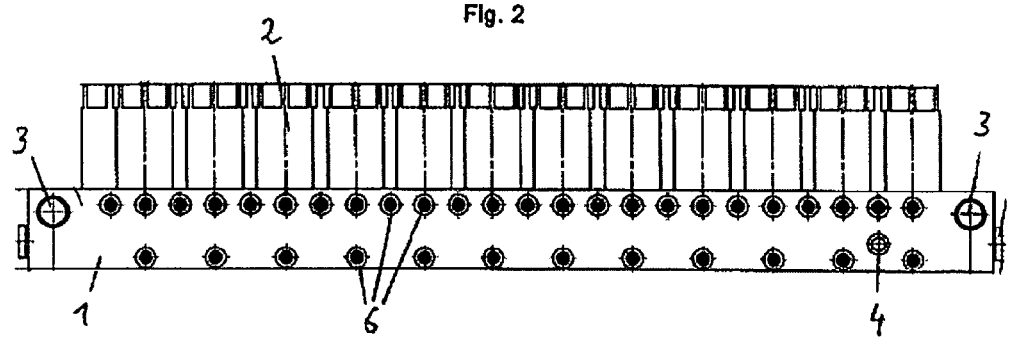
Figure 3:
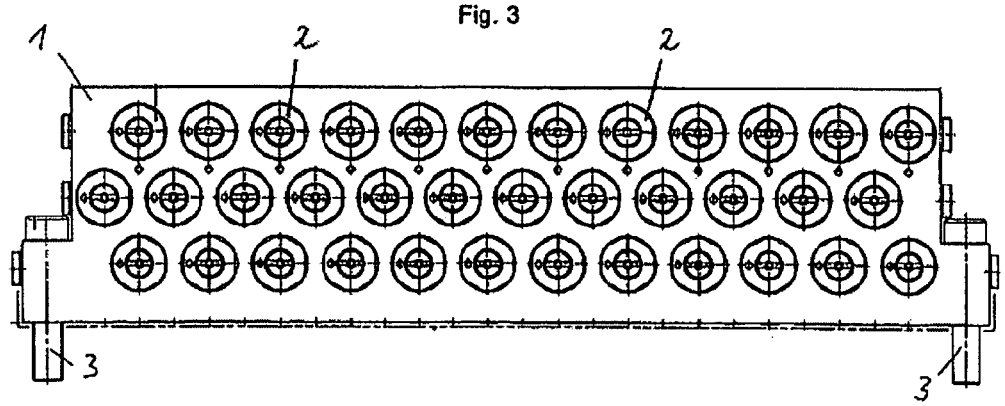
Figure 4:
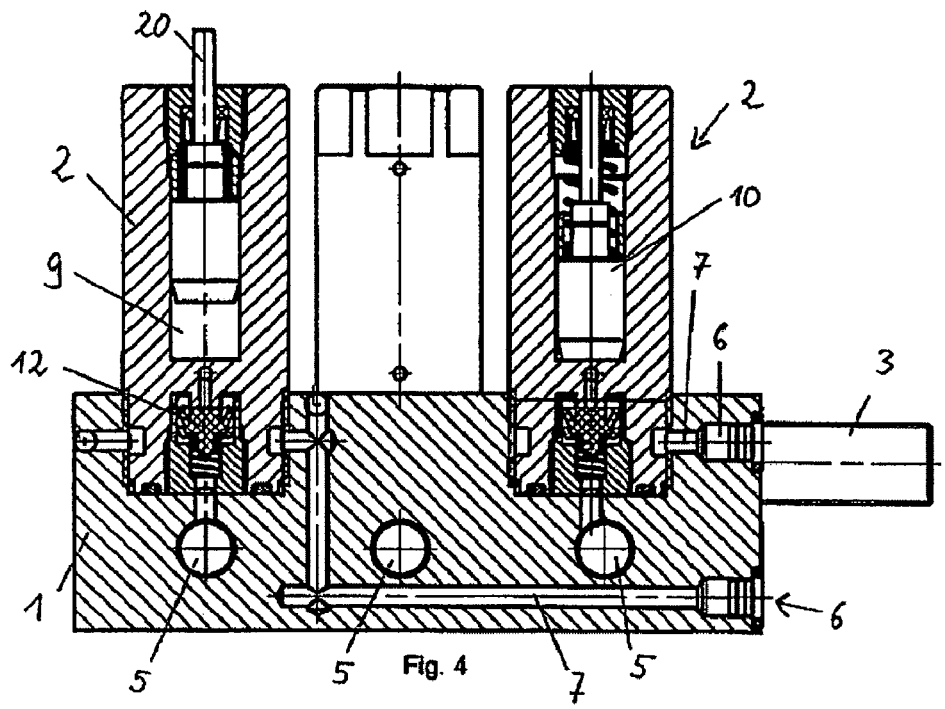

The lubricant distributor shown in FIGS. 1 to 4 is formed essentially by a distributor plate 1 and several injectors 2 connected to this plate. The distributor plate 1 here has an essentially block-like shape and has two projections in which screws 3 or similar attachment means are provided in order to mount the lubricant distributor on an element not shown in the figures. A lubricant supply channel 4 is formed in the connection surface from which the screws 3 project. Pressurized lubricant can be introduced into the lubricant distributor by means of this channel 4.

The distributor plate 1 is here constructed in such a way that several boreholes are provided that form inlet channels 5 communicating with the lubricant supply channel 4. These inlet channels open into several first connections. Furthermore, in the connection surface of the distributor plate 1, several lubricant discharge channels 6 are provided according to the number of injectors 2 that can be mounted on the distributor plate 1. These discharge channels each open through outlet channels 7 into a second connection. Both the supply of lubricant to the lubricant distributor and also the discharge of lubricant from the lubricant distributor are thus performed via the connection surface of the distributor plate.

In a surface of the distributor plate 1 running perpendicular to and bordering the connection surface in FIG. 1, there is a plurality of threaded boreholes corresponding to the number of injectors 2. As is visible from the side view of FIG. 4, one of the inlet channels 5 opens into the end face of each of the boreholes and thus defines the first connection, while an outlet channel 7 opens in a lateral surface of each of the boreholes to define the second connection. As explained below in more detail, the injectors are here screwed into the threaded boreholes essentially upright, i.e., with their longitudinal axes perpendicular to the plane of the distributor plate 1, wherein the injectors 2 are here each connected to a first and a second connection. The lubricant discharge channels 6 opening into the connection surface of the distributor plate 1 can each be closed by a check valve.

With reference to the FIGS. 5 and 6, the configuration and the function of the injectors 2 will be explained in more detail. Each of the injectors 2 is essentially formed by a, for example, cylindrical housing 8 and a dosing and reversing unit arranged in this housing.

Figure 5:
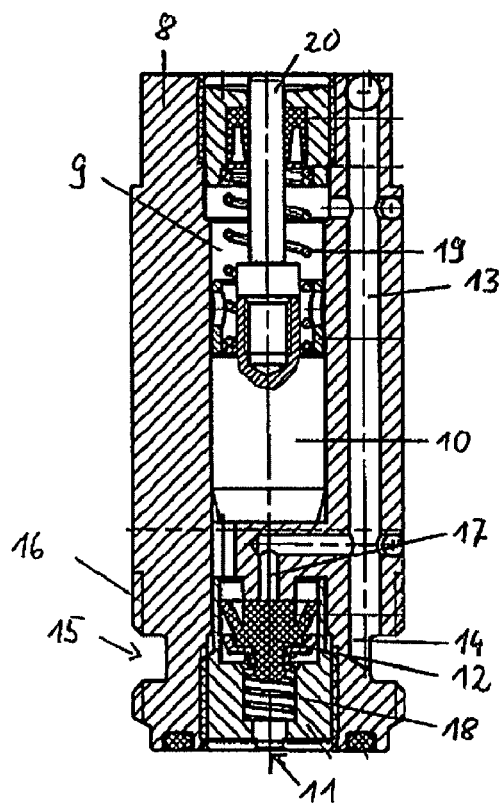

In the housing 8, a cylindrical chamber 9 is formed, in which a piston 10 can be displaced in a sealed way, so that the cylindrical chamber 9 is divided into a first (lower) chamber and a second (upper) chamber in FIG. 5. In the lower end face of the housing 8 in FIG. 5, a lubricant inlet 11 is formed that can be connected to the first connection in the threaded borehole of the distributor plate 1 by screwing the injector 2 into the distributor plate 1. From the lubricant inlet 11, a channel leads into the first chamber of the cylindrical chamber 9, wherein, in this channel a check valve 12 is provided such that lubricant can flow from the lubricant inlet 11 into the first chamber, while flow in the reverse direction is blocked.

The second chamber of the cylindrical chamber 9 is connected by means of a channel 13 running essentially parallel to the cylindrical chamber 9 to a lubricant outlet 14 that is formed on the same end section of the housing 8 in which the lubricant inlet 11 is also provided. The lubricant outlet 14 is here formed not in the end face of the housing 8, but instead in a groove 15 that lies in the vicinity of the end wall with the lubricant inlet 11. The groove is here provided in an external threaded section 16 that is used for screwing the injector 2 into a corresponding threaded borehole of the distributor plate 1.

A bypass channel 17 branches from the channel 13 and is closed by the check valve 12 as long as lubricant is introduced through the lubricant inlet 11 into the housing 8. Here the check valve 12 is forced by a spring 18 in the direction toward the piston 10. Another, stronger spring 19 forces the piston 10 in FIG. 6 downward.

Figure 6:
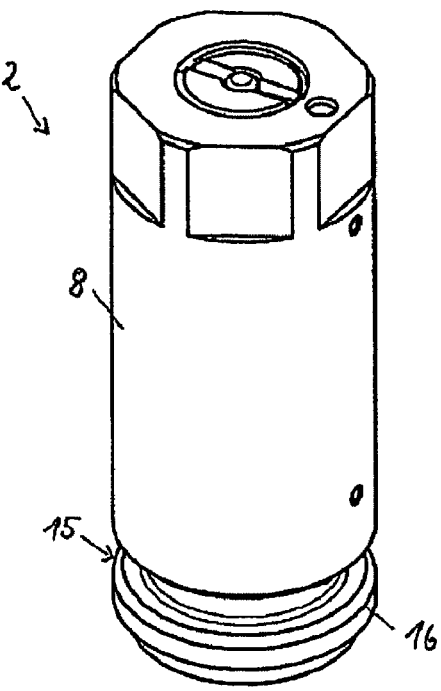
Figure 7:
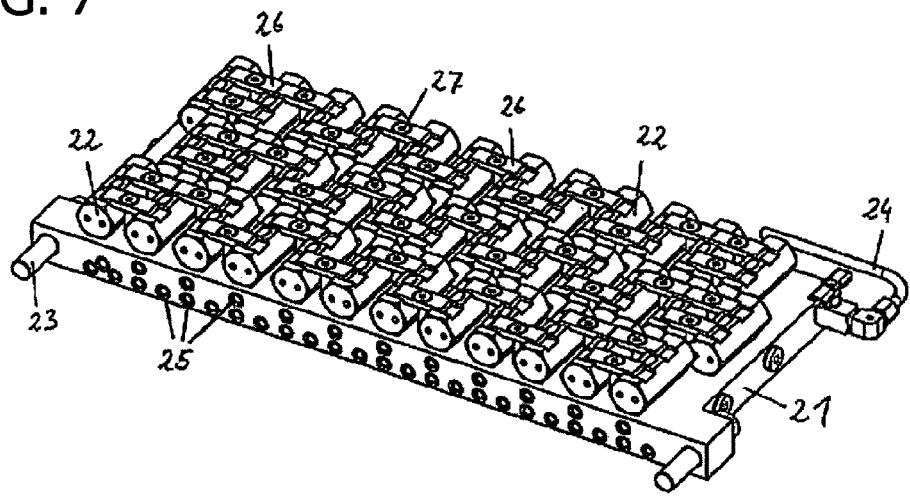

An indicator pin 20 that can be displaced together with the piston 10 is formed on the upper side of the piston 10 in FIGS. 5 and 6. In the position shown in FIG. 6, the indicator pin 20 is pulled back essentially into the housing 8. With a displacement of the piston 10, the indicator pin 20 projects out of the housing 8, so that the action of the injector 2 is visible from the outside.

The dosing and shifting of lubricant with the injector 6 is explained in more detail below. In the original position of FIG. 6, the piston 10 is pushed by the force of the spring 19 into its lower end position and the check valve 12 is forced upward by the force of the spring 18 for sealing the bypass channel 17. The second chamber of the cylindrical chamber 9 provided above the piston 10 and also the channel 13 are filled with lubricant. Now if additional lubricant is introduced under pressure through the lubricant inlet 11, this can pass the sealing lips of the check valve 12 and can reach into the first chamber of the cylinder chamber 9 by means of the perpendicular channel running in the figure at the left of the bypass channel 17. Here, the piston 10 is shifted against the force of the spring 19. This has the effect that the lubricant contained in the second chamber of the cylindrical chamber 9 is discharged through the channel 13 and out the lubricant outlet 14. Via the outlet channels 7 in the distributor plate 1, the lubricant then reaches the corresponding lubricant discharge channel 6 from which the lubricant reaches a lubrication point.

As soon as the pressure of the lubricant fed via the lubricant inlet 11 falls again, the piston 10 is forced downward by the force of the spring 19. Here, the check valve 12 is also moved downward against the force of the (weaker) spring 18 in the figure, so that a connection between the first chamber of the cylinder chamber 9 and the bypass channel 17 is opened. The lubricant thus can be shifted out of the first chamber of the cylindrical chamber 9 via the bypass channel 17 and the channel 13 into the second chamber of the cylindrical chamber 9. The injector 2 is then located in its original position shown in FIG. 6.

A second embodiment of a lubricant distributor formed essentially from a distributor plate 21 and several injectors 22 is shown in FIGS. 7 to 10. In contrast to the embodiment according to FIGS. 1 to 6, the injectors 22 are positioned not perpendicular to the distributor plate 21, but instead essentially horizontally, i.e., in a position in which the longitudinal axes of the injectors 22 extend parallel to the plane of the distributor plate 21.

The distributor plate 21 can be connected via screws 23 to a not-shown element as described above. In the distributor plate 21, there is a lubricant supply channel 24 that is connected by means of inlet channels to a first connection and lubricant discharge channels 25 that each open via corresponding outlet channels into a second connection. The first and second connections are here arranged not in a borehole, but instead lie in the upper side surface of the distributor plate 21 in FIG. 7.

Figure 8:
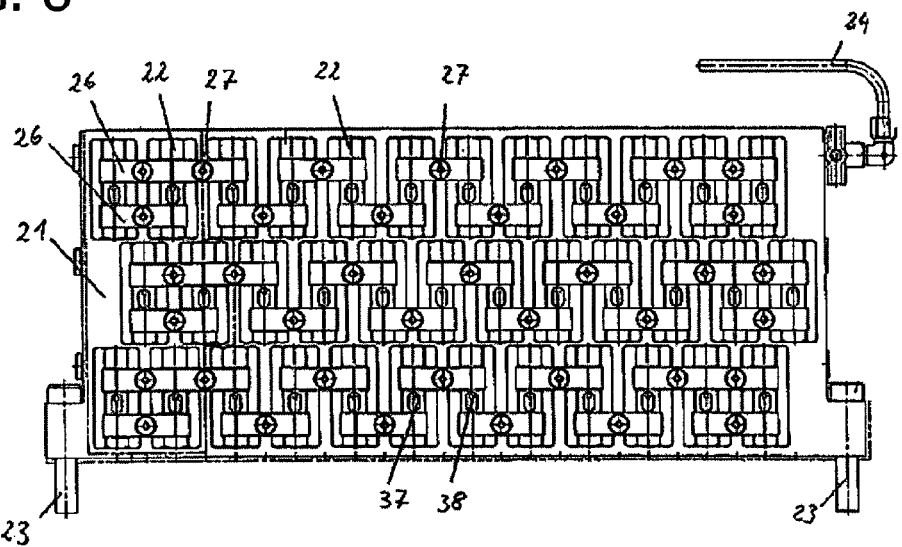

As is visible from FIG. 8, two injectors 22 are mounted via two holding plates 26 on the distributor plate 21. Here, each holding plate 26 is clamped by means of a screw 27 against the distributor plate 21, so that the injectors 22 are clamped tight between the holding plates 26 and the distributor plate 21.

Figure 9:
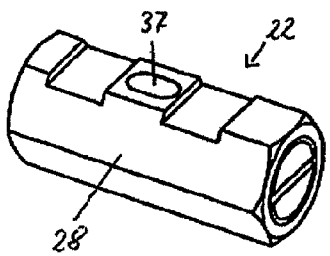
Figure 10:
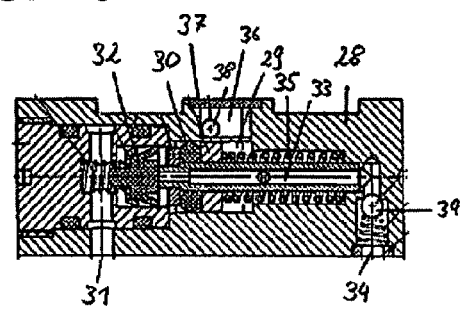

From the diagram of FIGS. 9 and 10, it is clear that the injectors 22 have a construction that is similar to the injectors 2 described above. Here, a cylindrical chamber 29 with a piston 30 is formed in a, for example, hexagonal housing 28. The piston here consists of two piston disks and a sealing ring, wherein one of the piston disks is constructed as an annular magnet.

By means of a lubricant inlet 31, lubricant is led past a check valve 32 into the first chamber on the left in FIG. 10 of the cylindrical chamber 29. The piston 30 is formed as a hollow piston to provide a bypass channel 33 for shifting lubricant. The chamber on the right in FIG. 10 of the cylindrical chamber 29 is connected to a lubricant outlet 34 that has a check valve 39. As explained above with reference to the first embodiment, the lubricant is discharged by displacing the piston 30 in FIG. 10 to the right when lubricant is introduced under pressure through the lubricant inlet 11 [sic; 31] into the housing 28. The lubricant is then shifted from the first chamber into the second chamber by the force of the spring 35 when the pressure of the lubricant at the lubricant inlet 31 drops.

For displaying the action and the operating state of the injector 22, a ball path 36 is formed in the housing 28 parallel to the cylindrical chamber 29. The ball path 36 can be seen from the outside through a view window 37. In the ball path 36, a ball 38 that is freely movable is held such that the ball 38 in the ball path 36 follows the movement of the annular magnet of the piston 30, wherein the ball 38 is made from a material that can be magnetized. The movement of the piston 30 is thus visible from the outside by the movement of the ball 38.

It will be apparent from the foregoing that the task of the present invention is accomplished essentially by a lubricant distributor having one or more injectors each formed from a housing defining a longitudinal axis with an inlet and an outlet connecting to corresponding connections in the distributor plate. The distributor also includes a dosing and reversing unit in the housing. The inlets and outlets are arranged on the side of the housing facing the distributor plate or on the end of the housing facing the distributor plate. Because each of the injectors has a separate housing, it is possible to exchange individual injectors quickly, without exchanging the entire lubricant distributor. This exchangeability is promoted, in particular, in that the corresponding connections of the distributor plate and also the inlets and outlets of the injector are each arranged on only one side or on one end of the housing.

Advantageously, the one or more injectors are attached to the distributor plate in such a way that the longitudinal axis of the housing of the injector is oriented at least essentially perpendicular to the surface of the distributor plate in which surface the connections connecting to the inlet and outlet are provided. In other words, the injector constructed, for example, with a cylindrical and/or polygonal profile can be mounted essentially upright on the distributor plate. In this way, in particular, many injectors can be arranged on a distributor plate.

In one embodiment of the invention, each of the one or more injectors has a threaded section which can be screwed into a threaded borehole of the distributor plate. The inlet and outlet of the injector lie on the threaded section. This means that both the inlet and the outlet can be arranged, for example, in one end face of the injector housing. Alternatively, it is possible for one of the inlet or the outlet to be provided in the end face of the housing, while the other of the outlet or inlet is provided close to the end face of the housing, for example, in the lateral surface of the housing. Thus, the injector can be connected to the corresponding connections of the distributor plate quickly and easily by the connection to the distributor plate.

According to another embodiment of the invention, each of the one or more injectors is mounted on the distributor plate in such a way that the longitudinal axis of the housing of the injector is oriented at least essentially parallel to the surface of the distributor plate, in which surface the connections connecting to the inlet and outlet are provided. In this embodiment, the injector advantageously has a flattened surface facing the distributor plate and consequently essentially laid on the distributor plate. The overall height of the lubricant distributor can be reduced in this way.

For connecting the injectors to the distributor plate, advantageously at least one holding plate or a similar attachment element is provided which can be clamped against the distributor plate, for example, by means of a screw, in such a way that the one or more injectors can be clamped tight onto the distributor plate, wherein the inlet and outlet of the injector lie on the side facing away from the holding plate. For example, two injectors can be mounted on the distributor plate by means of a common holding plate, wherein a screw or the like running between the two injectors clamps the holding plate against the distributor plate. However, for the secure bonding of the injectors to the distributor plate, it is preferred if two injectors are fixed by means of two holding plates or the like.

The task forming the basis of the invention is further accomplished by an injector that can be used, for example, in a lubricant distributor of the type named above. According to the invention, this injector has a housing in which a lubricant inlet and a lubricant outlet are formed on the same end and/or on the same side of the housing. The injector also has a dosing and reversing unit that is accommodated in the housing. This dosing and reversing unit has a cylindrical chamber and a piston that can be displaced in this chamber by the lubricant pressure against the force of an elastic element and also has a check valve arranged between the cylindrical chamber and the lubricant inlet. The piston divides the cylindrical chamber into a first chamber allocated to the lubricant inlet and a second chamber allocated to the lubricant outlet. These chambers can be selectively connected to each other by means of a bypass channel for dosing and/or shifting the lubricant. Here it is preferred if the check valve is arranged in a channel between the lubricant inlet and the first chamber in such a way that lubricant can flow from the lubricant inlet into the first chamber and a flow of lubricant from the first chamber to the lubricant inlet is blocked, and wherein the check valve blocks the bypass channel when lubricant flows from the lubricant inlet into the first chamber.

According to a preferred embodiment of the invention, the piston is connected to an indicator pin that can be displaced at least partially out of the housing as a function of the position of the piston in the cylindrical chamber. Also, for a large number of injectors, the defect of one single injector can be determined easily, because for each stroke of the dosing piston, the indicator pin moves out of the housing, and by means of this arrangement it is possible to visually inspect the function of the relevant injector. During the shifting of the lubricant, the indicator pin is pulled back into the housing. In this way it is indicated that the injector is then ready to operate again for the next lubrication.

An especially simple connection of the injector to the distributor plate of a lubricant distributor is enabled in that the housing has at one end an external threaded section in which a peripheral groove is formed in which the lubricant outlet opens, wherein the lubricant inlet is formed in one face of the housing on the same end. Consequently, by screwing in the injector, both the lubricant inlet and also the lubricant outlet are connected to the corresponding connections of the distributor plate.

According to another embodiment of the invention, the piston of the injector is formed at least in some regions by a magnet, wherein, in the housing, a ball path is formed that is separated from the cylindrical chamber and that can be viewed from the outside through a view window. In this ball path, a ball that is freely movable is held such that the ball follows the movement of the magnet. Thus, the movement of the ball that can be seen from the outside indicates not only whether the injector is defective but also in what operating state the injector is positioned.

If the injector is to be arranged essentially horizontally on the distributor plate, it is preferred that the housing have at least one flattened side wall in which the lubricant outlet and the lubricant inlet lie.

According to one aspect of the invention, the bypass channel can run essentially in the longitudinal direction of the housing, in order to selectively connect to each other the two chambers of the cylindrical chamber separated by the piston. Here, according to one embodiment, the bypass channel can be formed at least in some regions by a channel that connects the second chamber to the lubricant outlet. Alternatively or additionally, it is also possible here that the piston be formed as a hollow piston, wherein the bypass channel extends at least in some regions through the hollow piston.

Furthermore, the task forming the basis of the invention is accomplished independently of the features named above by a distributor plate that is suitable, in particular, for use in a lubricant distributor of the type named above. This distributor plate has a lubricant supply channel that opens via inlet channels into a first connection that can be connected to a lubricant inlet of an injector and has several lubricant discharge channels that each open via outlet channels into a second connection that can be connected to a lubricant outlet of an injector. The first and second connections are constructed on or in a first side surface of the distributor plate, and the lubricant discharge channels are formed on or in another side surface of the distributor plate. Through this formation of the distributor plate, it is possible in an especially simple way to exchange either individual injectors or to exchange the entire distributor plate, because the plate can be mounted, for example, by means of only two screws or the like onto an element that has channels corresponding to the lubricant discharge channels.

These channels lead to the individual lubrication points. The (additional) side surface of the distributor plate in which the lubricant discharge channels are arranged thus forms the attachment or connection surface by means of which the distributor plate is connected to the element.

According to a preferred embodiment of the invention, several boreholes are provided in the first side surface of the distributor plate. In particular, these boreholes are threaded and have end faces which face the first connections and lateral surfaces which face the second connections. By inserting and/or screwing in an injector, the connections are connected to the lubricant inlet and the lubricant outlet of the injector.

According to another embodiment of the invention, the first connections and the second connections open into the first side surface of the distributor plate. In this embodiment, the injectors can be mounted essentially horizontally on the distributor plate.

LIST OF REFERENCE SYMBOLS

1 Distributor plate
2 Injector
3 Screw
4 Lubricant supply channel
5 Inlet channel
6 Lubricant discharge channel
7 Outlet channel
8 Housing
9 Cylindrical chamber
10 Piston
11 Lubricant inlet
12 Check valve
13 Channel
14 Lubricant outlet
15 Groove
16 Threaded section
17 Bypass channel
18 Spring
19 Spring
20 Indicator pin
21 Distributor plate
22 Injector
23 Screw
24 Lubricant supply channel
25 Lubricant discharge channel
26 Holding plate
27 Screw
28 Housing
29 Cylindrical chamber
30 Piston
31 Lubricant inlet
32 Check valve
33 Bypass channel
34 Lubricant outlet
35 Spring
36 Ball path
37 View window
38 Ball
39 Check valve

The invention claimed is:

1. A lubricant distributor comprising a distributor plate and one or more injectors connected to the distributor plate, each injector comprising a housing having a longitudinal axis, an inlet and an outlet, said inlet and outlet connecting to corresponding connections in the distributor plate, and a dosing and reversing unit in the housing, and wherein the inlet and outlet of the housing are arranged on the housing to face the distributor plate, wherein the one or more injectors are mounted on the distributor plate such that the longitudinal axis of the housing of each injector is oriented at least essentially perpendicular to a surface of the distributor plate in which the connections connecting to the inlet and outlet are provided, wherein the housing of each injector has an end section that can be screwed into a threaded borehole of the distributor plate, wherein the inlet and outlet of the housing of the injector lie on said end section, wherein the housing has at one end an external threaded section in which a peripheral groove is formed in which the outlet opens, and wherein the inlet is formed in a face of the housing on the same one end.

2. An injector for a lubricant distributor, said injector comprising a housing in which a lubricant inlet and a lubricant outlet are formed on a same end of the housing, and a dosing and reversing unit in the housing, said dosing and reversing unit comprising a cylindrical chamber, a piston movable in the cylindrical chamber by lubricant pressure against the force of an elastic element, and a check valve located between the cylindrical chamber and the lubricant inlet, wherein the piston divides the cylindrical chamber into a first chamber communicating with the lubricant inlet and a second chamber communicating with the lubricant outlet, wherein a bypass channel is provided for connecting the first and second chambers for dosing and/or shifting the lubricant, wherein the housing has at one end an external threaded section in which a peripheral groove is formed in which the lubricant outlet opens, and wherein the lubricant inlet is formed in a face of the housing on the same one end.

3. An injector according to claim 2, characterized in that the piston is connected to an indicator pin that can be displaced at least partially out of the housing as a function of the position of the piston in the cylindrical chamber.

4. An injector according to claim 2, characterized in that the piston is formed as a hollow piston, and wherein the bypass channel runs at least in some regions through the hollow piston.

5. A distributor plate for a lubricant distributor, said distributor plate comprising a lubricant supply channel that opens by means of inlet channels into a first connection that can be connected to a lubricant inlet of an injector, and several lubricant discharge channels that open by means of outlet channels into a second connection that can be connected to a lubricant outlet of an injector, wherein the first and second connections are formed on or in a first side surface of the distributor plate and the lubricant discharge channels are formed on or in another side surface of the distributor plate, wherein several threaded boreholes are provided in the first side surface, and wherein the first connections are arranged in end surfaces of the boreholes and the second connections are arranged in lateral surfaces of the boreholes.

* * * * *